United States Patent
Tripathi et al.

(10) Patent No.: US 6,807,266 B2
(45) Date of Patent: Oct. 19, 2004

(54) METHOD AND APPARATUS FOR PROVISIONING A SOFT SWITCH

(75) Inventors: Anoop Tripathi, Mount Prospect, IL (US); Ashish Sardesai, Schaumburg, IL (US); Sudhakar Ramakrishna, Lake Zurich, IL (US)

(73) Assignee: 3Com Corporation, Santa Clara, CA (US)

( * ) Notice: Subject to any disclaimer, the term of this patent is extended or adjusted under 35 U.S.C. 154(b) by 98 days.

(21) Appl. No.: 10/232,149

(22) Filed: Aug. 30, 2002

(65) Prior Publication Data

US 2004/0042600 A1 Mar. 4, 2004

(51) Int. Cl.[7] .......................... H04M 3/42; G06F 15/177
(52) U.S. Cl. ............................ 379/201.12; 379/201.03; 709/220
(58) Field of Search ........................ 379/201.01, 201.12, 379/207.02, 201.03, 219, 242; 709/220, 223, 227; 370/401

(56) References Cited

U.S. PATENT DOCUMENTS

| | | | |
|---|---|---|---|
| 2001/0038689 A1 * | 11/2001 | Liljestrand et al. | 379/201.03 |
| 2002/0188725 A1 * | 12/2002 | Mani | 709/227 |
| 2003/0063623 A1 * | 4/2003 | Leslie et al. | 370/466 |
| 2003/0091026 A1 * | 5/2003 | Penfield et al. | 370/352 |
| 2003/0161296 A1 * | 8/2003 | Butler et al. | 370/352 |

* cited by examiner

*Primary Examiner*—Benny Tieu
(74) *Attorney, Agent, or Firm*—Fitch, Even, Tabin & Flannery

(57) ABSTRACT

A provisioning server (11) having various operating modes serves to provide a unified logical view of a soft switch (10) to a user via a display (14) and in response to receiving new service information from the user, provisioning corresponding configuration parameters to various of the logical communications support platforms (10A–F) that comprise the soft switch. Depending upon the mode of operation, the provisioning server can also receive current configuration parameter information from the logical platforms.

20 Claims, 4 Drawing Sheets

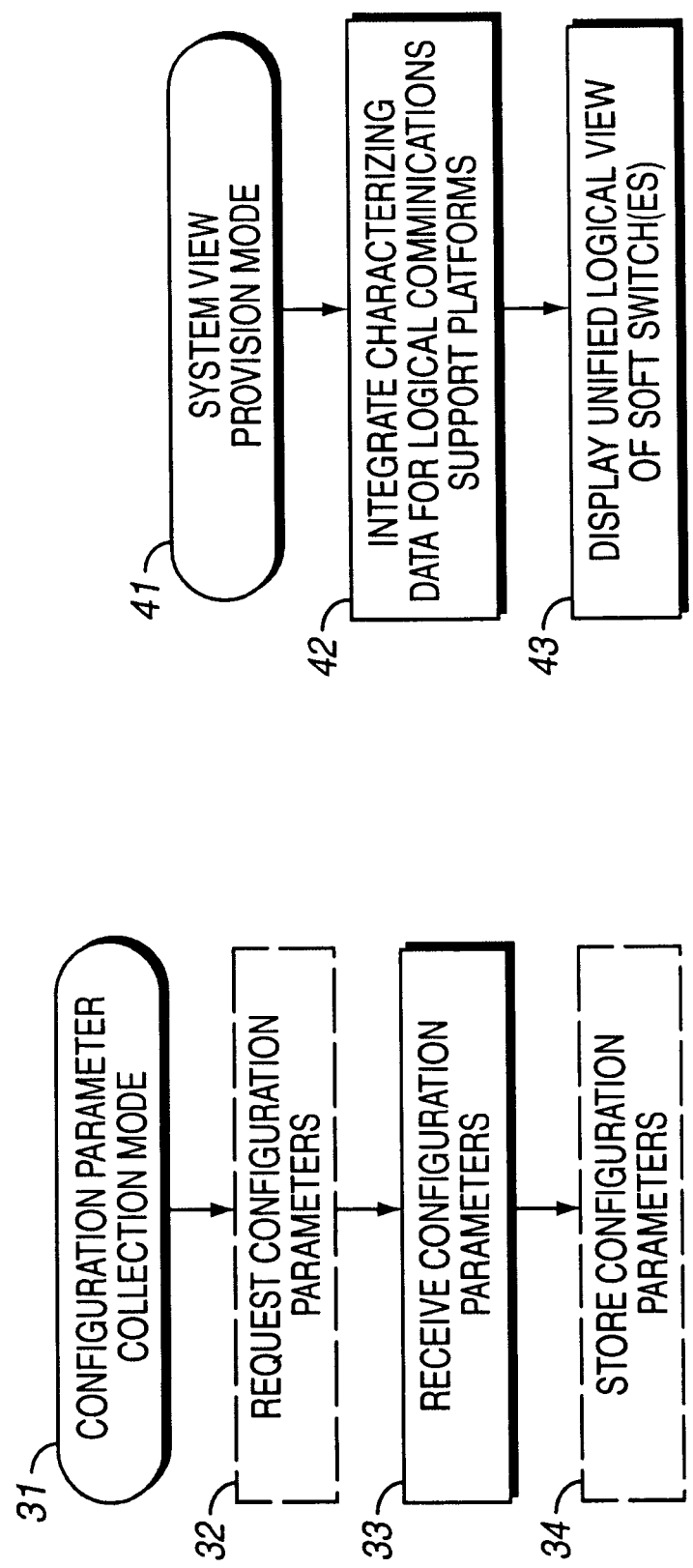

METHOD AND APPARATUS FOR PROVISIONING A SOFT SWITCH

TECHNICAL FIELD

This invention relates generally to next generation telecommunications switches and more particularly to soft switches and the facilitation of new or altered services in them.

BACKGROUND

Telecommunications switches are well known in the art. Generally speaking, a switch is a network device that selects a path by which to forward a unit of data to a next destination. Until relatively recently, switches have tended to be substantially wholly physically integrated physical entities and unique proprietary platforms dedicated to a single kind of service (such as, for example, serving the needs of long distance service providers or the needs of local service providers). As service providers and their consumers have desired and demanded an ever-widening offering of related services, however, such a closed-box approach has often constituted an obstacle to the development and fielding of new services. In many cases, the designer and manufacturer of any given switch could not or would not make the alterations that were desired by a given customer or potential customer.

As a result, more recently, so-called soft switches are becoming available. In general, the make-up of a soft switch comprises a decomposed switch architecture. So configured, the various logical elements of a switch are often provided through provision of many independent platforms that communicate and inter-operate through use of standard communications interfaces and protocols. Such a decomposed architecture offers an opportunity for considerably more designers and manufacturers to offer credible partial solutions to the switch marketplace. In various ways, the development of the soft switch has placed unprecedented opportunity in the hands of the service provider to themselves imagine and fashion new services to better serve the needs of their customer base.

Unfortunately, the decomposed nature of a soft switch has itself led to the existence of new problems that can again inhibit the ease by which a service provider can create and implement a new service. In particular, virtually all network elements in a soft switch (which network elements essentially comprise logical communications support platforms such as, but not limited to, media gateways, session managers, signaling gateways, SIP proxies, directory servers, accounting servers, and the like) each have a corresponding set of configuration parameters that control, influence, or otherwise bias and shade the exact operation of the network element. Proper setting of these configuration parameters is usually necessary to ensure compatible and supportive operation of a given network element in a given soft switch environment. Enabling a new service via a soft switch will typically require altering one or more of these configuration parameters for one or more of the network elements that comprise the soft switch.

To date, however, such configuration parameters must typically be set on a logical platform-by-logical platform basis. Even when only one or a few such logical platforms require an actual configuration parameter change to effect provision of a given new service, the system manager will typically have to review and consider most or all of the system's network elements to ascertain and confirm this condition. Amongst other logistical challenges, this can require that the user interact successfully with a plurality of unique user interfaces as provided by potentially unique manufacturers for each network element that comprise the system. As a result, new service creation is again often at least postponed or even stymied due to the difficulty of actually ensuring that all system components are properly considered and updated as necessary to support the new service.

BRIEF DESCRIPTION OF THE DRAWINGS

The above needs are at least partially met through provision of the method and apparatus for provisioning a soft switch described in the following detailed description, particularly when studied in conjunction with the drawings, wherein:

FIGS. 3 through 6 comprise flow diagrams that relate to different modes of operation of a provisioning server as configured in accordance with an embodiment of the invention.

Figure 1:
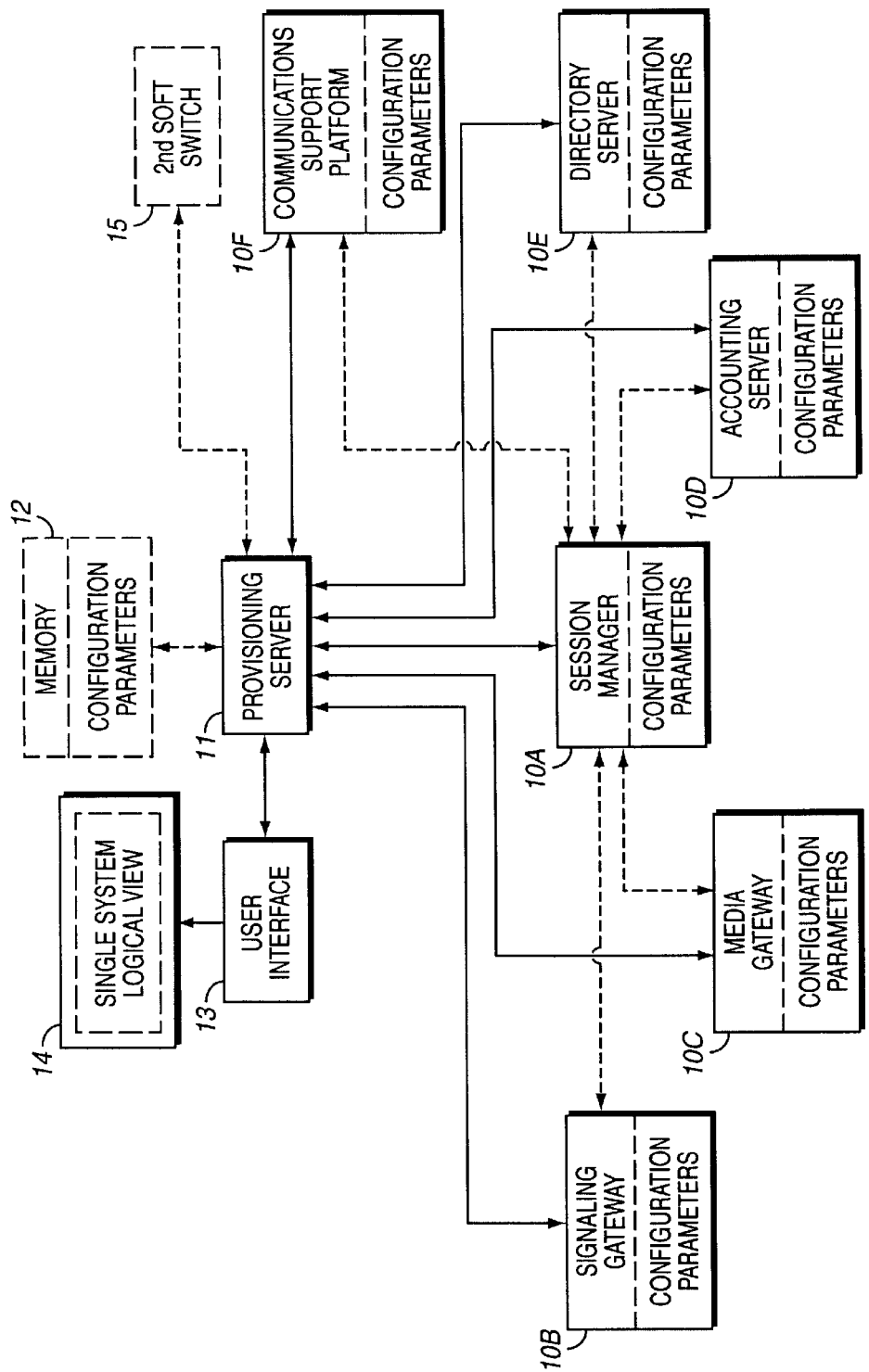
FIG. 1 comprises a block diagram as configured in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, a provisioning server couples to (or optionally can be made a part of) a soft switch that is otherwise comprised of a plurality of logical communications support platforms that are themselves each individually configurable pursuant to a set of configuration parameters. The provisioning server operably couples to these logical platforms and has a number of related operating modes.

In one operating mode, the provisioning server receives information from the plurality of logical communications support platforms regarding their individual configuration parameters. In one embodiment, such information can be unilaterally supplied by the logical communications support platforms from time to time or pursuant to such other triggering mechanism as may be appropriate to a given application. In another embodiment, the provisioning server can cause the offering of such information through transmission of an appropriate polling request.

In another operating mode, the provisioning server provides one or more configuration parameters to one or more of the logical communications support platforms. Such configuration parameters can comprise an altered configuration parameter or a new configuration parameter for the given recipient platform. Depending upon the environment, and pursuant to other operating modes, the provisioning server can itself develop the configuration parameters that it provides to the logical communications support platforms to accord with and otherwise facilitate the implementation of a new or revised service.

Pursuant to another embodiment, yet another operating mode serves to present a logical view of the plurality of logical communications support platforms to a user. This logical view can preferably comprise a unified logical view of the soft switch itself. So configured, the user can view the soft switch as a single entity (rather than as a disparate collection of separate physical entities). In addition, the user can facilitate changes with respect to the operation of the switch, which changes relate to the creation or modification of a service. The provisioning server can then utilize these changes that are made with respect to a unified view of the switch and convert those changes into specific configuration requirements for each of the logical platforms. These configuration requirements are then readily converted into specific configuration parameters which the provisioning server can then provide to the plurality of logical communications support platforms using one or more of the operating modes mentioned above.

So configured, the provisioning server offers a single point of user interaction, thereby greatly simplifying the task for the user of understanding the soft switch for purposes of effecting an alteration or creation of a service. In addition, the provisioning server offers a mechanism by which configuration parameters alterations as are required to effect such service alteration or creation are readily determined and disseminated for and amongst the plurality of logical communications support platforms.

Few if any modifications to the constituent components of the soft switch are necessary to effect compatible integration of the provisioning server. As a result, in many cases, these embodiments will greatly facilitate the ease by which a service is created or modified.

Referring now to the drawings, and in particular to FIG. 1, a soft switch 10 can be comprised of a wide variety of logical communications support platforms, including, for example, a session manager platform 10A, a signaling gateway platform 10B, a media gateway platform 10C, an accounting server platform 10D, and a directory server platform 10E, as well as such other communications support platforms 10F as may be desired to support desired functionality and/or load requirements (including network elements such as a proxy server, a location server, and the like). Platforms such as these are well known in the art and hence additional explanatory information (apart from additional description regarding interfaces for such platforms as appears below) will not be provided here for the sake of brevity and the preservation of focus. It should be noted, however, that such platforms are, at the least, logical entities. As such, they can exist as isolated hardware platforms or they can share a common hardware platform with one or more other such logical entities. Similarly, being logical entities, any of them can also exist in distributed form over a plurality of hardware hosts. Such architectural alternatives are all compatible with the various embodiments taught herein and can benefit greatly therefrom.

Pursuant to a preferred embodiment, a provisioning server 11 is operably coupled to some (and preferably all) of these logical communications support platforms. This coupling can be facilitated via one or more shared data buses if desired. In a preferred embodiment, a star-configuration serves to effect this coupling and supports a Simple Network Management Protocol (SNMP) as is known and understood in the art. Other communication protocols could of course be used as an alternative. For these purposes, however, use of SNMP offers a number of advantages including relatively ubiquitous compatibility amongst available and planned network elements that may likely be used as logical communications support platforms. In particular, the Simple Network Management Protocol utilizes, in a preferred embodiment, Management Information Base (MIB) elements to permit the exchange of configuration parameter information as related below between the provisioning server 11 and various of the logical communications support platforms. As with SNMP, MIB is well understood in the art and also constitutes a relatively common interface capability for many relevant network elements.

As with most servers, the provisioning server 11 can be comprised of a single hardware platform or can be distributed over several dedicated (or shared) hardware platforms as desired and/or as required by the needs of a given application. In general, such a server comprises a highly programmable platform. As such, the provisioning server 11 is readily programmed to effect the various modes of operation as disclosed herein. In addition, it should also be understood that such a provisioning server 11 can be configured to serve the needs of a single soft switch 10, or, in the alternative, can serve to support a plurality of soft switches such as an additional second soft switch 15.

The provisioning server 11 has access to memory, which memory can be an internal memory and/or an optional external memory 12. In addition to storing such application software as may appropriately be retained in this storage facility, such memory also includes, in a preferred embodiment, configuration parameter information as pertains to at least some and preferably all of the logical communications support platforms in the corresponding soft switch.

In a preferred embodiment, the provisioning server 11 couples to (or includes internally) a user interface 13. This user interface 13 preferably provides a mechanism whereby a user can provide instructions or data (such as information that pertains to the creation of a new service). The input mechanism can be any such input mechanism as is known, including but not limited to keyboards (both hardware oriented and virtual), cursor movement devices, speech recognition platforms, touch screens, and the like.

In addition, the user interface 13 preferably also includes at least one display 14. In a preferred embodiment, this display 14 supports provision of a single system logical view to the user. In particular, notwithstanding the literal decomposed make-up of the soft switch 10, the view provided to the user constitutes a unified logical view such that the disparate elements of the soft switch, regardless of how decomposed and/or distributed they may be, appear as a single integrated entity. In essence, "a" switch is presented to the user rather than a conglomeration of independent network elements. When the provisioning server 11 provides provisioning services to a plurality of soft switches as alluded to above, if desired, the unified logical view provided via the provisioning server 11 can be extended to include the logical integration of the additional soft switches.

Certain benefits of such a configuration will become more clear further below.

Figure 2:
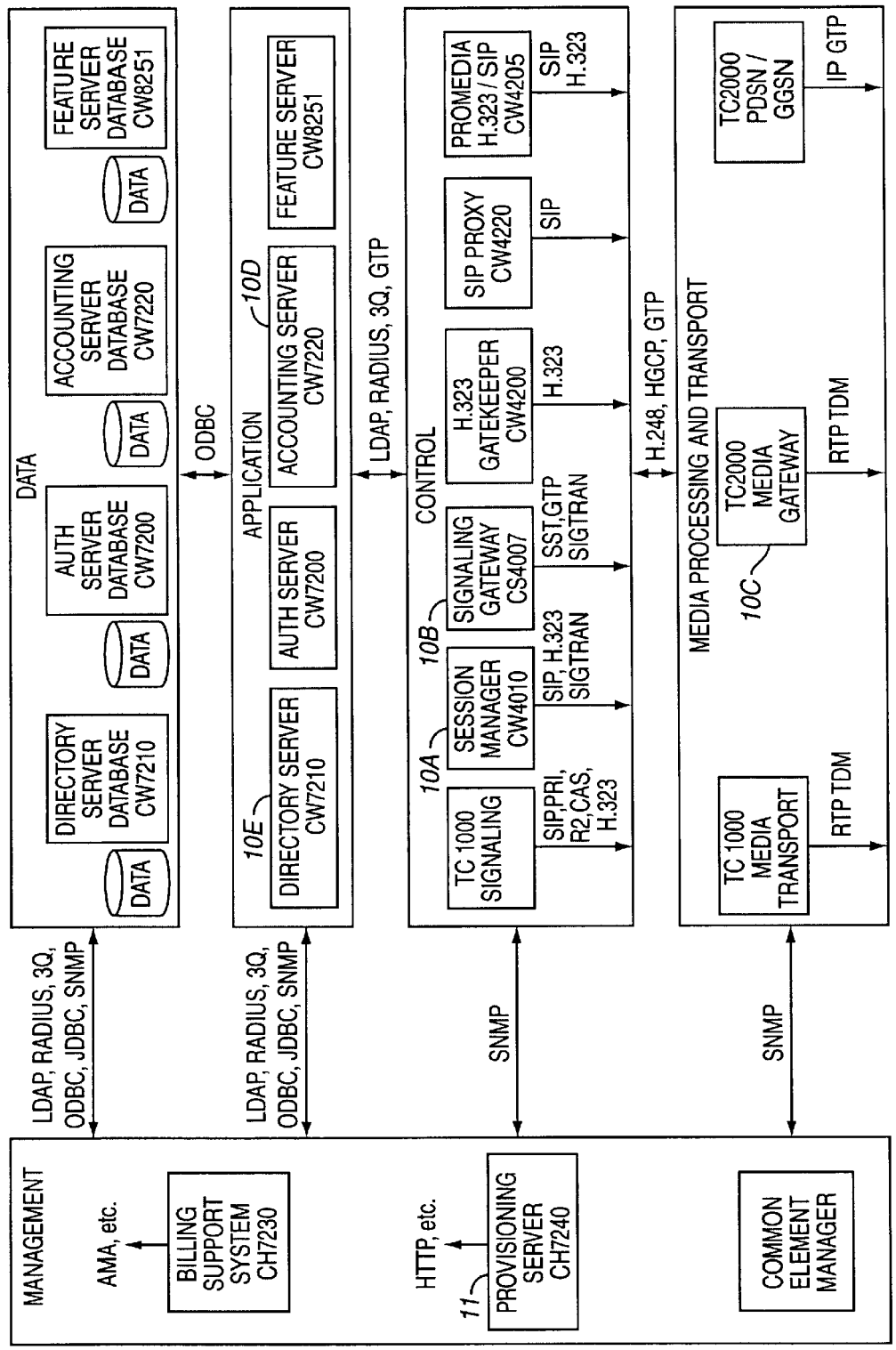
FIG. 2 comprises a soft switch map as configured in accordance with an embodiment of the invention.

Referring now to FIG. 2, it may be helpful to some readers to appreciate the hierarchical management relationship of the provisioning server 11 with respect to the other logical communications support platforms. Viewing the logical elements of the soft switch in a logically mapped fashion, the provisioning server 11 comprises a management-category entity that communicates (preferably via SNMP as disclosed above) with application-category entities such as the previously mentioned directory server 10E and accounting server 10D, control-category entities such as the previously mentioned session manager 10A and signaling gateway 10B, and media processing and transport-category entities such as the previously mentioned media gateway 10C. Although such categories inter-communicate and extra-communicate using a variety of corresponding protocols as are known in the art (such as SS7/SIP for communicating control information, RTP/TDM for data transport, and ODBC for communicating data to and from relevant databases) virtually all of these entities are also compatible with SNMP as this constitutes, again, a common management-purpose protocol. So configured, the provisioning server 11 can effect the communications needs described herein with respect to its various operating modes.

As mentioned above, the provisioning server 11 preferably has a number of operating modes. Pursuant to a configuration parameter collection mode 31 (and referring now to FIG. 3), the provisioning server 11 requests 32 information regarding the configuration parameters from the logical communications support platforms. This request 32 can be effected in a number of ways, including by a sequential one-on-one polling process or by a point-to-multipoint broadcast inquiry (presuming that the logical communications support platforms have an appropriate response mechanism, such as a contention-based protocol or a synchronous schedule-based protocol, by which to provide a useful response as a group). Following this request 32, the provisioning server 11 then receives 33 the configuration parameter information from the logical platforms. Such information can be provided in a number of ways. For example, the information can comprise the values of the configuration parameters themselves (either alone or in combination with indicia that identifies the corresponding configuration parameter). If desired, the information can instead be modified in some way as desired (for example, to minimize bandwidth requirements). For example, the information can be provided in a more symbolic or vectorized form factor. Such information, once received 33, can then be used as desired. In a preferred embodiment, such configuration parameters are optionally stored 34 in a corresponding memory 12 upon receipt and/or after some amount of appropriate pre-processing or review.

In one embodiment, such configuration variable information is received and collected on a regular basis. If desired, the step of requesting 32 such information can be eliminated (during at least some periods of operation) by simply requiring frequent unsolicited updates from the logical communications support platforms. If desired, such information need only be solicited and received at the time the provisioning server 11 requires such information. In the alternative, the information can be gathered asynchronously with respect to need such that the information remains available for use when and if needed.

Various communication methods and protocols can be used to request and/or to receive such information. As already noted, SNMP MIB serves well to support both requesting and receiving such information in this embodiment.

Referring now to FIG. 4, pursuant to a system view provision mode 41, the provisioning server 11 integrates 42 the characterizing data for the logical communications support platforms and then displays 43 a corresponding unified view of the overall soft switch (or switches, as the case may be) as already described above. The characterizing data can comprise a functional, logical representation of the various network elements (as versus a physically accurate description) and does not necessarily include the configuration parameters themselves, as such parameters often comprise a level of detail that the user does not necessarily require. In the alternative, the view can indeed present some or all of the configuration parameters for some or all of the logical communications support platforms in a unified and integrated fashion.

Figures 5, 6:
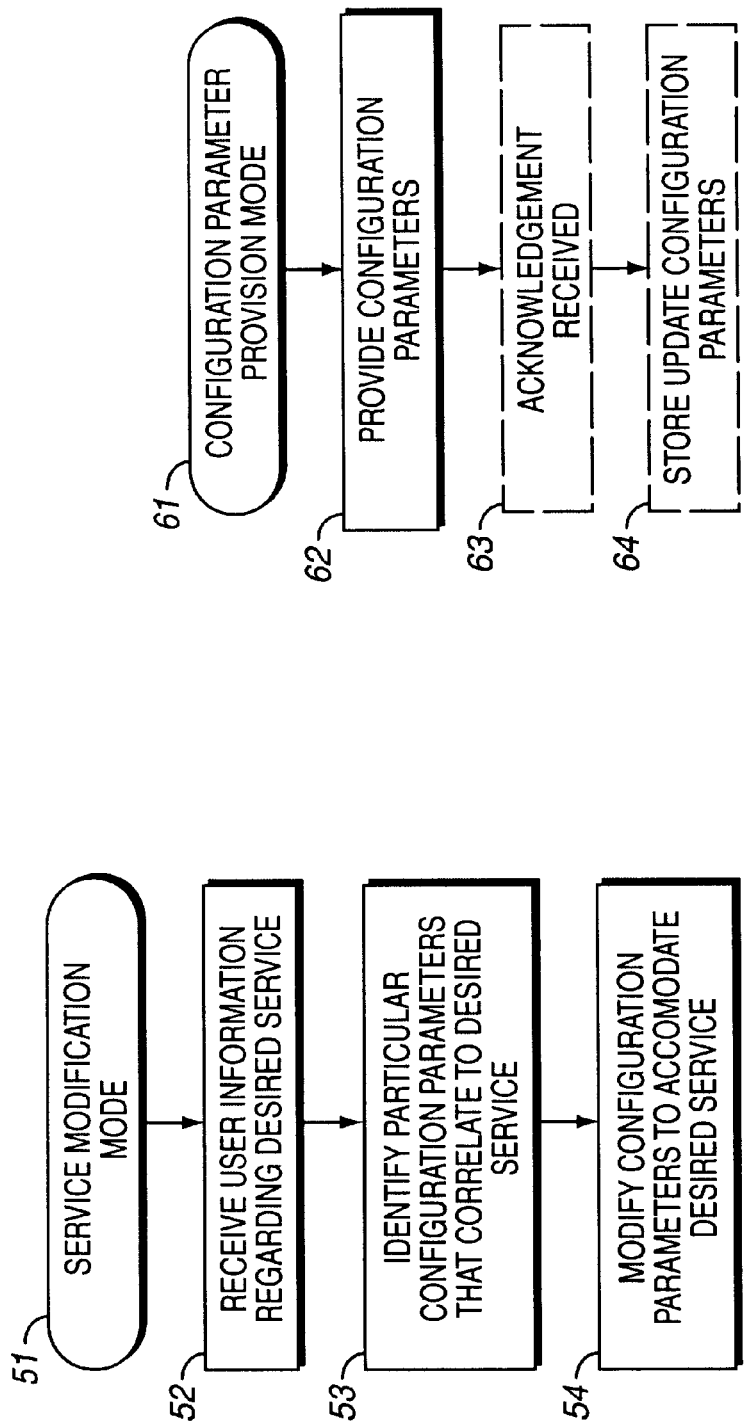

Referring now to FIG. 5, pursuant to a service modification mode of operation 51, the provisioning server 11 receives 52 user information regarding a desired service (which may represent a change to or deletion of an existing service or a new service entirely). Such service information can be received from the user via the user interface 13 and will preferably be based upon inputs made by the user upon referring to the unified logical view as has been provided via the display 14. The provisioning server 11 then identifies 53 particular configuration parameters of particular logical communications support platform that correlate to the desired service and modifies 54 those configuration parameters to accommodate the desired service. So configured, the user does not need to understand or have information regarding the configuration parameters for each logical platform. Instead, the user can communicate a higher level statement of requirements, and the provisioning server 11 correlates those requirements to facilitate identification of the necessary and required logical platforms and their corresponding configuration parameters. In general, such correlation itself is readily achieved through use of appropriate lookup tables that the provisioning server 11 can build to track and monitor each parameter of each platform.

Pursuant to a configuration parameter provision mode 61 (and referring now to FIG. 6), the provisioning server 11 provides 62 configuration parameters to the logical communications support platforms as appropriate. Such provisioning may occur, for example, on a regular (or irregular) basis without regard for whether a new service has recently been initiated. In this way, the provisioning server 11 can assure that each logical platform is utilizing a correct set of configuration parameters to suit the present suite of supported services. Or, in a preferred embodiment, such provisioning occurs following the modification of configuration parameters as occurs during the service modification mode 51 described above. Following the provisioning an acknowledgment can optionally be received 63 and/or information regarding the updated configuration parameters can be stored 64.

So configured, the provisioning server 11 presents a unified logical view of the system to a user, thus simplifying the task of the user when that user seeks to establish the requirements for a new or modified service. The user then provides those new service requirements to the provisioning server 11, which in turn converts those requirements into specific configuration parameter needs. The provisioning server 11 then provides updated configuration parameter information to various logical communications support platforms as required to effect the new or modified service. New services can be created and existing services can be modified with considerable ease and improved alacrity. These benefits accrue in part due to the simplified user interface and also in part to the improved accuracy and reliability by which the provisioning server 11 can ensure that configuration parameters throughout the soft switch are changed as appropriate to support the desired service.

To illustrate these capabilities in the context of an actual example, consider the implementation of trunk group services in a soft switch. There are, in general, three kinds of trunk groups: one-way incoming, one-way outgoing, and two-way trunk groups. One-way incoming trunk groups correspond to calls that will be received only by the soft switch on trunks in this trunk group (to put it another way, outgoing calls will not be originated by the soft switch on these trunks). One-way outgoing trunk groups correspond to calls that will be originated by the soft switch on trunks in this group (but for which no calls may be received). Two-way trunk groups correspond to trunks that will support both call origination and reception. In general, to support creation or modification of any such trunk group will usually require alteration of configuration parameters at a number of different network elements. For example, at least the signaling gateway 10B, the media gateway 10C, and the directory server 10E will ordinarily require parameter modification to effect service creation or modification for one or more trunk groups.

To facilitate the creation of a new trunk group, for example, the provisioning server 11 would provide the following configuration parameter information to the indicated logical communications support platforms:

The signaling gateway/media gateway controller:
Parameters that relate to support for multiple media gateways that are a part of the same trunk group;
Parameters that relate to selection policy for a media gateway from the group supporting one trunk group;
ISUP Data Parameters;
The media gateway:
Multiple Originating Point Code/Destination Point Code/CIC or CIC Ranges;
Glare Policies;
Blocking Policies;
The directory server:
Trunk Group ID;
Multiple Originating Point Code/Destination Point Code/CIC or CIC Ranges;
Routing Policies;

It can be seen that some of these network elements have common configuration parameters. Such circumstances are not uncommon and are emblematic of part of the difficulty one finds when trying to effect a new or modified service in a prior art soft switch. Here, however, the provisioning server 11 is aware of the multiple locations of configuration parameter information when such conditions exist and automatically ensures that the configuration parameters are correctly modified at all relevant locations.

After such automatic provisioning, the new trunk group service is enabled. Following appropriate CIC registration by the media gateway 10C, the media gateway will apply the appropriate blocking policies to the SS7 network. For a call destined to the SS7 network, the media gateway 10C can query the directory server 10B for the appropriate Point Code/CIC/CIC Ranges for a called party number. The directory server 10E can resolve the called party number to a trunk group ID and further the trunk group ID in accord with the Multiple Originating Point Code/Destination Point Code/CIC or CIC Ranges by applying appropriate routing policies as per the guiding configuration parameters. In response to its inquiry, the media gateway 10C will receive the Multiple Originating Point Code/Destination Point Code/CIC or CIC Ranges information from the directory server 10E. The media gateway 10C can select the appropriate CIC by applying the provisioned glare policies. If any ISUP data parameters were provisioned for that CIC then those parameters would be applied before dispatching an IAM to the SS7 network.

In essence, then, it can be seen that trunk group services can be readily formed or modified through the provisioning server 11 in a convenient, reliable, accurate, and effective manner. This trunk group example is illustrative only, and it should be clear that all manner of services can be facilitated through the same basic processes.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A provisioning server for use with a telecommunications soft switch, which soft switch includes a plurality of logical communications support platforms, which platforms are each individually at least partially configured pursuant to a set of configuration parameters, the provisioning server comprising an interface that is operably coupled to the plurality of logical communications support platforms and which provisioning server has at least a first mode of operation, a second mode of operation, and a third mode of operation, wherein:

pursuant to the first mode of operation the provisioning server receives information from the plurality of logical communications support platforms regarding their individual configuration parameters;

pursuant to the second mode of operation the provision server provides new configuration parameter information to specific logical communications support platforms; and pursuant to the third mode of operation the provision server provides a logical view of the plurality of logical communications support platforms to a user.

2. The provisioning server of claim 1 wherein the plurality of logical communications support platforms are each independently coupled to the interface.

3. The provisioning server of claim 1 wherein the plurality of logical communications support platforms are comprised on a common housing.

4. The provisioning server of claim 1 wherein at least some of the plurality of logical communications support platforms comprise physically separate platforms from one another.

5. The provisioning server of claim 1 wherein the interface comprises a simple network management protocol compatible link.

6. The provisioning server of claim 1 wherein pursuant to the first mode of operation the provisioning server receives management information base information from the plurality of logical communications support platforms that comprises the information representing the individual configuration parameters.

7. The provisioning server of claim 1 wherein pursuant to the second mode of operation the provision server provides new configuration parameter information to specific logical communications support platforms to thereby effect a modification to a service that is supported by the telecommunications soft switch.

8. The provisioning server of claim 1 wherein the provisioning server has at least a fourth mode of operation, wherein pursuant to the fourth mode of operation the provisioning server receives service modification information from a user and uses that service modification information to automatically determine the new configuration parameter information that is provided during the second mode of operation.

9. The provisioning server of claim 1 wherein the interface is operably coupled to the logical communications support platforms for a plurality of telecommunications soft switches.

10. The provisioning server of claim 9 wherein the provisioning server has another mode of operation wherein pursuant to the another mode of operation the provision server provides a unified logical view of the plurality of telecommunications soft switches to a user.

11. The provisioning server of claim 1 and further comprising provisioning means for providing configuration parameters to the plurality of logical communications support platforms.

12. The provisioning server of claim 11 wherein the provisioning means further serves to receive user information regarding a desired service for the telecommunications soft switch and uses that user information to automatically determine which configuration parameters of which logical communications support platforms need alteration in order to support the desired service.

13. A provisioning server for use with a telecommunications soft switch, which soft switch includes a plurality of logical communications support platforms, which platforms are each individually at least partially configured pursuant to a set of configuration parameters, the provisioning server comprising:

an interface that is operably coupled to the plurality of logical communications support platforms;

input means for receiving service information from a user;

a memory having configuration parameter information as corresponds to the plurality of logical communications support platforms stored therein;

provisioning means operably coupled to the interface, the input means, and the memory for modifying configuration parameter information as a function, at least in part, of the service information from the user in order to define a soft switch configuration that will support a specific desired service.

14. The provisioning server of claim 13 wherein the provisioning means further provides modified configuration parameter information via the interface to the logical communications support platforms such that the logical communications support platforms can use the modified configuration parameter information to thereby facilitate support of the specific desired service.

15. The provisioning server of claim 13 wherein the input means includes display means for providing a unified logical view of the telecommunications soft switch to the user.

16. The provisioning server of claim 13 wherein the provisioning means further receives information from the plurality of logical communications support platforms regarding their individual configuration parameters and stores at least some of this received information in the memory.

17. A method comprising:

providing a telecommunications soft switch comprising a plurality of logical communications support platforms;

operably coupling the plurality of logical communications support platforms to a provisioning server;

at the provisioning server:

receiving information from a user regarding a desired service;

correlating the information regarding the desired service to specific configuration parameters for various ones of the plurality of logical communications support platforms to identify particular configuration parameters;

modifying at least some of the particular configuration parameters to accommodate the desired service to provide modified configuration parameters;

providing the modified configuration parameters to the plurality of logical communications support platforms.

18. The method of claim 17 wherein providing a telecommunications soft switch comprising a plurality of logical communications support platforms includes providing a telecommunications soft switch comprising a plurality of logical communications support platforms including at least one of a signaling gateway, a proxy server, a location server, an authentication and authorization server, a billing and accounting server, a session manager, and a directory server.

19. The method of claim 17 and further comprising, at the provisioning server, receiving information regarding the configuration parameters for the plurality of logical communications support platforms.

20. The method of claim 19 wherein receiving information regarding the configuration parameters for the plurality of logical communications support platforms includes receiving management information base information.

* * * * *